(12) United States Patent
Kim et al.

(10) Patent No.: US 9,544,163 B2
(45) Date of Patent: Jan. 10, 2017

(54) SECURITY SYSTEM AND METHOD USING HOME GATEWAY ALLIANCE

(71) Applicants: AMBUS CO., LTD., Yongin-si, Gyeonggi-do (KR); Jung Soo Kim, Anyang-si, Gyeonggi-do (KR)

(72) Inventors: Jung Soo Kim, Anyang-si (KR); Kee Woon Na, Yongin-si (KR)

(73) Assignees: AMBUS CO., LTD., Yongin-si, Gyeonggi-do (KR); Jung Soo Kim, Anyang-si, Gyeonggi-do (KR)

( * ) Notice: Subject to any disclaimer, the term of this patent is extended or adjusted under 35 U.S.C. 154(b) by 0 days.

(21) Appl. No.: 14/651,223

(22) PCT Filed: Oct. 14, 2013

(86) PCT No.: PCT/KR2013/009147
§ 371 (c)(1),
(2) Date: Jun. 10, 2015

(87) PCT Pub. No.: WO2014/098361
PCT Pub. Date: Jun. 26, 2014

(65) Prior Publication Data
US 2016/0191264 A1 Jun. 30, 2016

(30) Foreign Application Priority Data
Dec. 21, 2012 (KR) .................. 10-2012-0151459

(51) Int. Cl.
*G08B 1/08* (2006.01)
*H04L 12/28* (2006.01)
(Continued)

(52) U.S. Cl.
CPC .......... *H04L 12/2807* (2013.01); *G08B 13/22* (2013.01); *H04L 12/2834* (2013.01); *H04L 12/6418* (2013.01); *H04L 12/66* (2013.01)

(58) Field of Classification Search
None
See application file for complete search history.

(56) References Cited

U.S. PATENT DOCUMENTS 6,134,303 A * 10/2000 Chen .................. H04M 11/04
379/42
6,661,340 B1 * 12/2003 Saylor ................. G08B 25/016
340/3.3
(Continued)

FOREIGN PATENT DOCUMENTS

JP 2002-132595 A 5/2002
JP 2011-010084 A 1/2011
(Continued)

OTHER PUBLICATIONS

International Search Report for application No. PCT/KR2013/009147 mailed on Jan. 13, 2014.

*Primary Examiner* — Ojiako Nwugo
(74) *Attorney, Agent, or Firm* — Hauptman Ham, LLP

(57) ABSTRACT

A security system using home gateway alliance includes an alliance management server which includes a gateway registration unit which registers at least one of position information and IP (Internet Protocol) information of a home gateway upon making a request for registration of the home gateway; and an alliance management unit which, in response to a request for alliance from a user terminal of the home gateway registered with the gateway registration unit, sets an alliance relationship between the home gateway having made the request for alliance and other home gateways adjacent to the home gateway having made the request for alliance.

14 Claims, 10 Drawing Sheets

(51) Int. Cl.
*H04L 12/64* (2006.01)
*G08B 13/22* (2006.01)
*H04L 12/66* (2006.01)

(56) References Cited

U.S. PATENT DOCUMENTS

| | | | | |
|---|---|---|---|---|
| 7,113,090 | B1* | 9/2006 | Saylor | G08B 13/19682 340/5.33 |
| 7,367,497 | B1* | 5/2008 | Hill | G07C 9/00111 235/380 |
| 8,054,165 | B2* | 11/2011 | Gallagher | H04W 60/04 340/286.02 |
| 2002/0126009 | A1* | 9/2002 | Oyagi | G08B 25/10 340/541 |
| 2004/0212493 | A1* | 10/2004 | Stilp | G06K 7/0008 340/531 |
| 2006/0063517 | A1* | 3/2006 | Oh | H04M 3/42348 455/415 |
| 2006/0103520 | A1* | 5/2006 | Clark | G08B 25/08 340/506 |
| 2007/0297393 | A1* | 12/2007 | Furukawa | H04L 12/66 370/352 |
| 2008/0076419 | A1* | 3/2008 | Khetawat | H04L 12/2602 455/435.1 |
| 2008/0254807 | A1* | 10/2008 | Duplessis | H04W 16/16 455/450 |
| 2010/0100972 | A1* | 4/2010 | Lemieux | G06F 21/57 726/34 |
| 2010/0177752 | A1* | 7/2010 | Aggarwal | H04L 45/50 370/338 |
| 2011/0103298 | A1* | 5/2011 | Walter | H04W 4/04 370/328 |
| 2011/0258618 | A1* | 10/2011 | Capuozzo | G06F 8/65 717/168 |
| 2014/0067150 | A1* | 3/2014 | Songkakul | G06Q 10/06312 700/297 |

FOREIGN PATENT DOCUMENTS

| | | |
|---|---|---|
| KR | 10-2007-0059908 A | 6/2007 |
| KR | 10-2009-0008873 A | 1/2009 |

* cited by examiner

SECURITY SYSTEM AND METHOD USING HOME GATEWAY ALLIANCE

CROSS REFERENCE TO RELATED APPLICATION

This application claims the priority of Korean Patent Application No. 10-2012-0151459, filed on Dec. 21, 2012 in the KIPO (Korean Intellectual Property Office). Further, this application is the National Phase application of International Application No. PCT/KR2013/009147 filed Oct. 14, 2013, which designates the United States and was published in Korean.

TECHNICAL FIELD

The present invention relates to a method for establishing a security system with alliance of a plurality of home gateways.

BACKGROUND ART

As interest in protection of lives and properties increases, domestic and foreign markets for security systems and security services are also increasingly growing.

A security service is largely divided into two categories: a manned security service where trained security guards are on the scene in case of security incidents; and an unmanned security service where security incidents are only reported to registered contact information in case of security incidents.

The unmanned security service where security guards are not dispatched to the scene of the security incident has only to cover the cost of installing security equipment with no extra expense. However, the unmanned security service is less effective in security since a victim of a security incident has to deal with the security incident. Although the security equipment has a function of making a call to predetermined contact information, it is very hard for police or fire departments to get detailed information on the security incident since the security equipment just provides a repeated pre-recorded voice. Besides, since the report is made in a recorded voice rather than in an interactive manner, the police department has trouble dispatching the police to the scene of the security incident.

The manned security service where security guards are dispatched to the scene of the security incident provides a more reliable security service than the unmanned security service. However, the manned security service requires security costs. Besides, if the security guard is distant from the scene of the security incident, the manned security service may become less effective. Actually, it has happened that before the security guard arrives at the scene, the security incident is already concluded.

In case of a security incident, either the manned security service or the unmanned security service alerts a victim of the security incident and his or her neighbors by setting off an alarm at the scene of the security incident. However, since the alarm is limited in loudness, the victim and his or her neighbors may not know about the occurrence of the security incident if they are distant from the scene of the security incident. This may make it hard to prevent subsequent damages.

DISCLOSURE

Technical Problems

The present invention provides a security system and method for efficiently dealing with security incidents by making an alliance for mutual security between home gateways which are located close to each other so that the security incidents can be promptly reported to allied parties.

Furthermore, the present invention provides a security system and method which enables individuals to report security incidents instead of using recorded voice, thereby overcoming a drawback of an unmanned security service where security guards are not dispatched to the scene of the security incident.

In addition, the present invention provides a security system and method which enables individuals other than a victim of a security incident to promptly observe and cope with the security incident and reduces security costs, thereby overcoming a drawback of a manned security service where security guards are dispatched to the scene of the security incident.

In addition, the present invention provides a security system and method which enables individuals around the scene of a security incident to be alert by broadcasting information on the security incident to all of home gateways which are located close to the scene of the security incident.

Technical Solutions

In one general aspect, there is provided a security system using home gateway alliance, including an alliance management server, wherein the alliance management server includes: a gateway registration unit which registers at least one of position information and IP (Internet Protocol) information of a home gateway upon making a request for registration of the home gateway; and an alliance management unit which, in response to a request for alliance from a user terminal of the home gateway registered with the gateway registration unit, sets an alliance relationship between the home gateway having made the request for alliance and other home gateways adjacent to the home gateway having made the request for alliance and, when a security incident message indicative of an occurrence of a security incident is received from the home gateway registered with the gateway registration unit, transmits a security incident notification message to either the allied home gateways, which have an alliance relationship with the home gateway where the security incident has occurred, or user terminals of the allied home gateways, wherein the alliance management unit manages the alliance relationship, which is classified into a report alliance relationship and an alert alliance relationship, and wherein the alliance management unit sets, as the report alliance relationship, home gateways which accept the request for alliance and sets, as the alert alliance relationship, other home gateways than the home gateways set as the report alliance relationship, from among all of home gateways located within a broadcast region which is predetermined based on a positional relation with the home gateway having made the request for alliance.

The alliance management server may further include a list generation unit which, upon receipt of the request for registration of the home gateway, generates information on a list of at least one home gateway adjacent in position to the home gateway which is requested to be registered, based on predetermined criteria, and the alliance management unit may transmit the list information to the home gateway which is requested to be registered, or the user terminal of the home gateway which is requested to be registered.

When receiving a request for alliance with a home gateway designated by a user from among the list information, the alliance management unit may transmit an alliance request message to the designated home gateway or a user terminal of the designated home gateway. The alliance management unit may transmit information on whether to accept the request for alliance, which is received from the user terminal of the designated home gateway in response to the alliance request message, to the user terminal or the home gateway which has made the request for alliance.

The alliance management unit may transmit to the home gateway or the user terminal which has made the request for alliance at least one of position information and IP address of a home gateway which has the report alliance relationship with the home gateway having made the request for alliance and at least one of position information and IP address of a home gateway which has the alert alliance relationship with the home gateway having made the request for alliance.

In case of a communication failure between the home gateway where the security incident has occurred and the alliance management server, the home gateway where the security incident has occurred may transmit a security incident notification message to the home gateway which has the report alliance relationship and the home gateway which has the alert alliance relationship, based on at least one of the position information and the IP address of the home gateway which has the report alliance relationship and at least one of the position information and the IP address of the home gateway which has the alert alliance relationship.

The security incident notification message may be transmitted to the allied home gateway. When the user terminal of the allied home gateway is not found within an internal network area which is covered by the allied home gateway, the security system may further include a message transmission server which transmits security incident information corresponding to the security incident notification message to the user terminal of the allied home gateway, upon request of the allied home gateway.

The alliance management unit may repeatedly transmit the security incident notification message to a home gateway having the report alliance relationship at predetermined intervals until the alliance management unit receives a report completion acknowledge message after transmitting the security incident notification message to the home gateway having the report alliance relationship.

The allied home gateway having received the security incident notification message may transmit a control signal such that an interworking security equipment performs a predetermined security function, or automatically report the security incident to a predetermined IP address or telephone number.

In another general aspect, there is provided a security method using home gateway alliance which is executed by an alliance management server included in a security system, the security method including: registering at least one of position information and IP (Internet Protocol) information of a home gateway upon receipt of a request for registration of the home gateway; in response to a request for alliance from a user terminal of the home gateway registered with the gateway registration unit, setting an alliance relationship between the home gateway having made the request for alliance and other home gateways adjacent to the home gateway having made the request for alliance; and when a security incident message indicative of an occurrence of a security incident is received from the home gateway registered with the gateway registration unit, transmitting a security incident notification message to either the allied home gateways, which have an alliance relationship with the home gateway where the security incident has occurred, or user terminals of the allied home gateways, wherein the setting of an alliance relationship includes managing the alliance relationship, which is classified into a report alliance relationship and an alert alliance relationship, setting, as the report alliance relationship, home gateways which accept the request for alliance and setting, as the alert alliance relationship, other home gateways than the home gateways set as the report alliance relationship, from among all of home gateways located within a broadcast region which is predetermined based on a positional relation with the home gateway having made the request for alliance.

The security method may further include: generating information on a list of at least one home gateway adjacent in position to the home gateway which is requested to be registered, based on predetermined criteria; transmitting the list information to the home gateway which is requested to be registered, or the user terminal of the home gateway which is requested to be registered; when receiving a request for alliance with a home gateway designated by a user from among the list information, transmitting an alliance request message to the designated home gateway or a user terminal of the designated home gateway; and transmitting information on whether to accept the request for alliance, which is received from the user terminal of the designated home gateway in response to the alliance request message, to the user terminal or the home gateway which has made the request for alliance.

The security method may further include transmitting to the home gateway or the user terminal which has made the request for alliance at least one of position information and IP address of a home gateway which has the report alliance relationship with the home gateway having made the request for alliance and at least one of position information and IP address of a home gateway which has the alert alliance relationship with the home gateway having made the request for alliance.

The security method may further include repeatedly transmitting the security incident notification message to an adjacent home gateway having the report alliance relationship at predetermined intervals until the alliance management unit receives a report completion acknowledge message after transmitting the security incident notification message to the home gateway having the report alliance relationship.

In a further general aspect, there is provided a computer readable storage for storing one or more programs with instructions for a user terminal communicating with a home gateway and an alliance management server to execute a security method using home gateway alliance, wherein the security method using home gateway alliance includes: acquiring position information of a home gateway which is connected with the user terminal over an internal network; transmitting to the alliance management server a message of a request for registration of the home gateway, the message including the position information; receiving information on a list of at least one home gateway adjacent in position to the home gateway which is requested to be registered; transmitting to the home gateway or the alliance management server a message of a request for alliance with a home gateway designated by a user from among the list information; and receiving and storing at least one of position information and IP address information of the home gateway which is set as an alliance relationship according to the message of a request for alliance.

In the computer readable storage, the security method using home gateway alliance may further include: when a security incident notification message is received from the home gateway which is set as an alliance relationship, displaying a screen for executing an automatic report on the security incident; and when a user inputs a request for report through the screen, executing the automatic report on the security incident to a predetermined IP address or telephone number.

Advantageous Effects

According to an embodiment of the present invention, in case of a security incident, the security incident can be promptly notified to home gateways which have an alliance relationship with a victim of the security incident or a home gateway of the victim, so that individuals other than the victim can report the security incident to security departments, such as police department. Accordingly, it is possible to provide a reliable report on the security incident.

Furthermore, according to an embodiment of the present invention, allied parties can cooperate with each other for security, thereby reducing the security service costs. Accordingly, even individuals in economic hardship can live a safe life with the aid of the security system.

In addition, according to an embodiment of the present invention, in case of a security incident, individuals around the scene of the security incident can arrive at the scene before security guards of a manned security service, thereby promptly coping with the security incident.

In addition, according to an embodiment of the present invention, all individuals around the scene of the security incident can be informed of the occurrence of the security incident, thereby preventing subsequent damages caused by the security incident.

DESCRIPTION OF PREFERRED EMBODIMENTS

Figure 1:
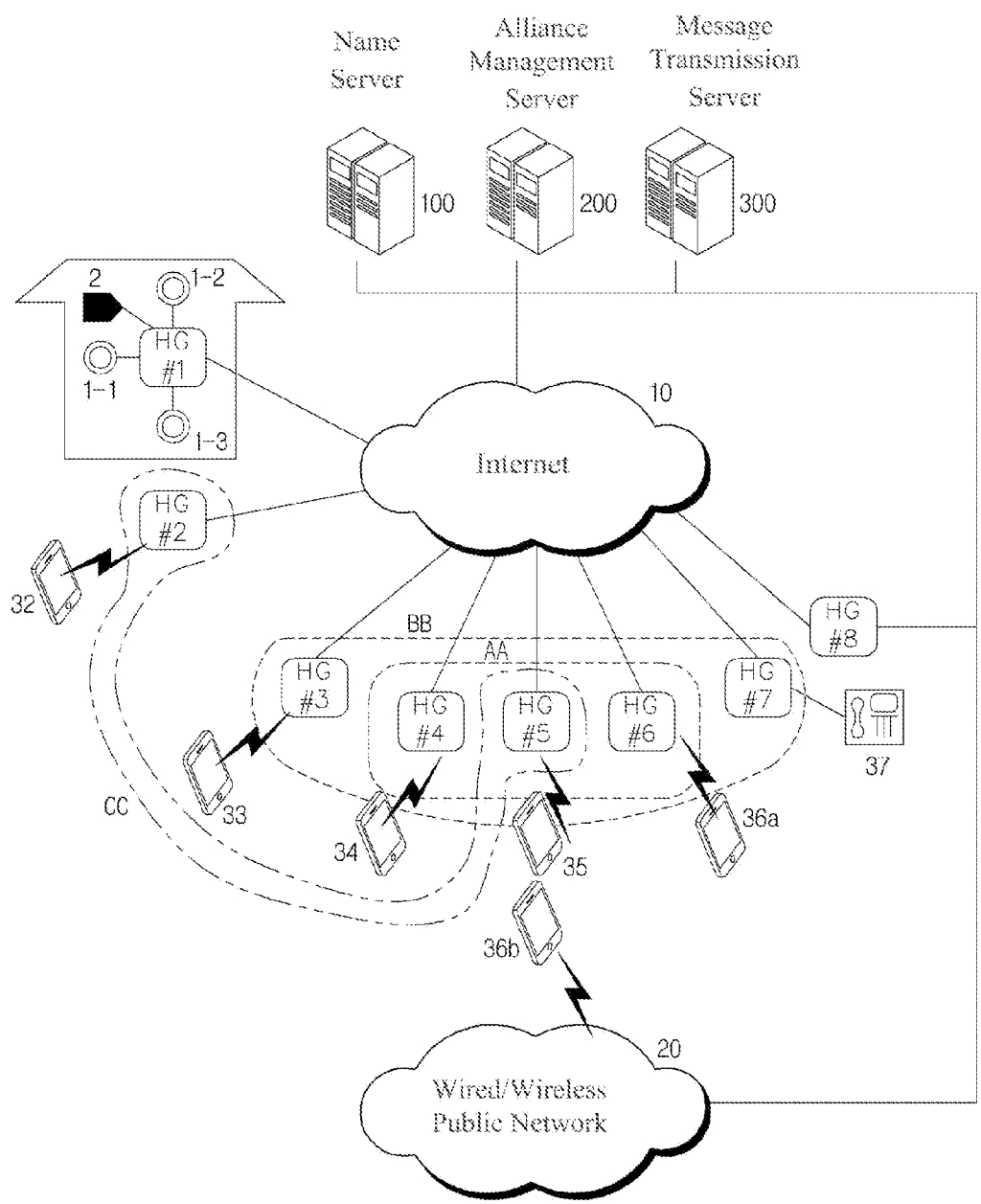
FIG. 1 is an overall diagram illustrating a security system using home gateway alliance according to an embodiment of the present invention.

These features are for illustrative purposes only and not for purposes of limiting the same. Other features will become apparent to those skilled in the art from the following detailed description which, taken in conjunction with the attached drawings, discloses exemplary embodiments of the invention. Various changes, modifications, and equivalents of the systems, apparatuses and/or methods described herein will suggest themselves to those of ordinary skill in the art.

Descriptions of well-known functions and structures are omitted to enhance clarity and conciseness. In addition, reference numerals (e.g., first, second, etc.) are only identifiers to distinguish elements from each other throughout the specification and drawings.

In the following detailed description, when it is described that an element is "connected" or "coupled" to another, it should be understood that the element may be connected or coupled to the other element directly or through an intermediate element interposed therebetween.

Hereinafter, the preferred embodiments of the present invention will be described in detail with reference to the accompanying drawings.

Figure 2:
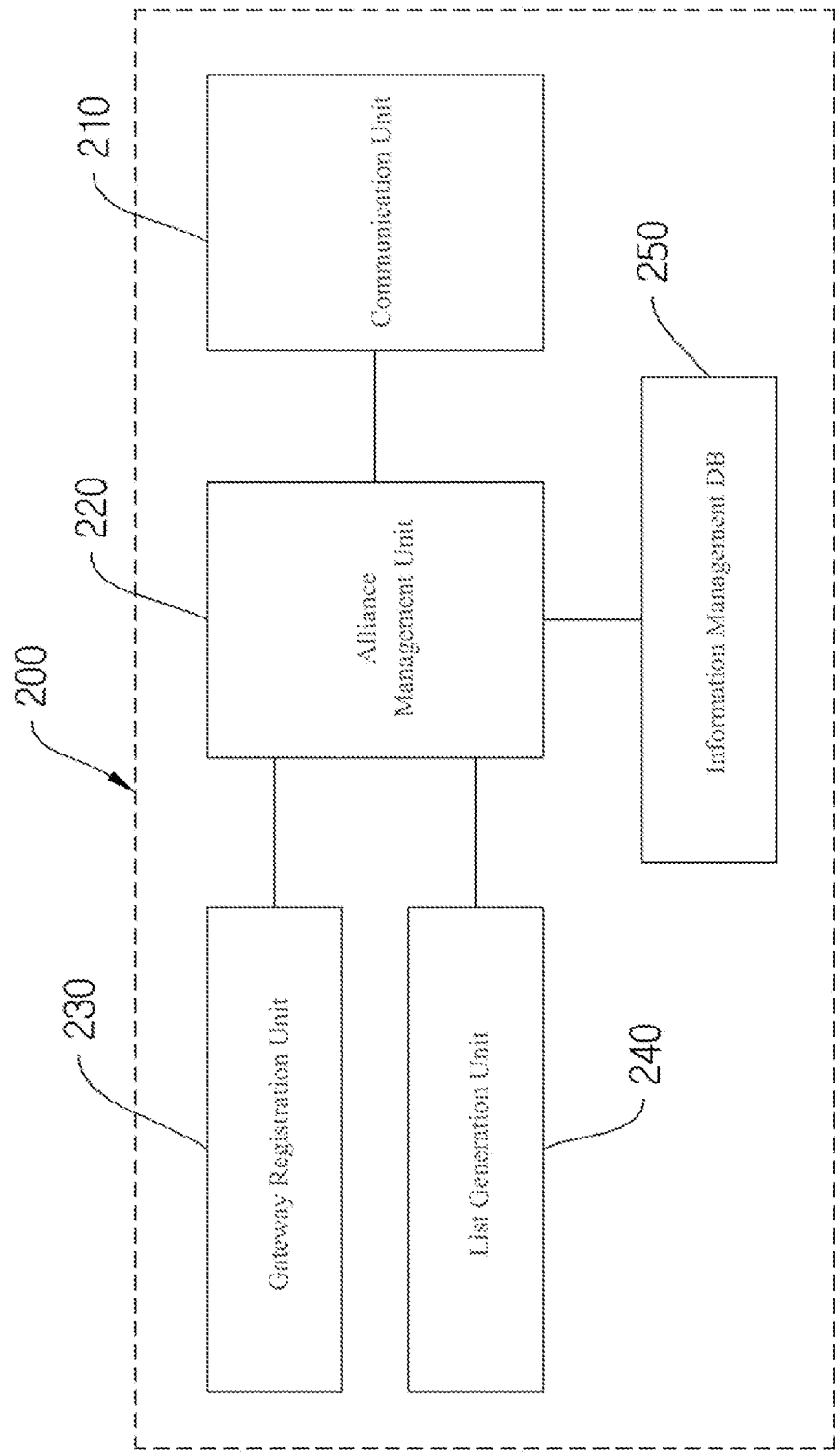
FIG. 2 is a block diagram illustrating an alliance management server according to an is embodiment of the present invention.

FIG. 1 is an overall diagram illustrating a security system using home gateway alliance according to an embodiment of the present invention. FIG. 2 is a block diagram illustrating an alliance management server according to an embodiment of the present invention.

Referring to FIG. 1, a security system using home gateway alliance may include a plurality of home gateways (HG#1~HG#8), wired/wireless user terminals (32, 33, 34, 35, 36a 36b 37), a plurality of servers (100, 200, 300) for performing embodiments of the present invention, an Internet (10), and a wired/wireless public network (20). The Internet (10) may be a typical Internet as a Wide Area Network (WAN) to which the home gateways are connected. The wired/wireless public network (20) may be a wide area network (WAN) except the Internet, such as PSTN, 3G wireless network, and LTE network.

The plurality of home gateways (HG#1~HG#8) may receive state signals or sensing signals of crime/disaster prevention sensors (1-1, 1-2, 1-3) installed in residential or commercial buildings directly or through another gateway and transmit the received information to the outside of the home gateways.

For an alliance security according to an embodiment of the present invention, each household, each building or each office may be provided with one or more home gateways which are connected to crime/disaster prevention sensors directly or indirectly and are able to process crime information or disaster prevention information. Examples of the crime sensor may include an infrared sensor, a thermal sensor, a motion sensor and a magnet sensor, and examples of the disaster prevention sensor may include a gas detector and a fire detector. The home gateway may transmit information about security incidents within its corresponding region to a user's wired/wireless terminal based on the information from the crime/disaster prevention sensors. Accordingly, the user may be informed of the state of the crime/disaster prevention sensors connected to the home gateway through his or her wired/wireless terminals, and receive text messages, photos, or videos about the security incidents. Examples of the wired/wireless terminal may include, but not limited to, a smart phone, a personal computer, and an Internet phone.

The user terminal may be provided with an application program which defines predetermined operations to be executed by the user in compliance with an alliance security method according to an embodiment of the present invention (hereinafter referred to as user security execution application). The user security execution application may be downloaded from a web page or an application store provided by an alliance management server (200), and installed on the user terminal. The user security execution application may also be downloaded from a website and an application store which are provided by a portal website provider (not shown) or an application provider (not shown). For this purpose, the alliance management server (200), the portal website provider, and the application provider may store the user security execution application in a predetermined storage (not shown). The operations of the user security execution application will be described in more detail with reference to FIGS. 3 to 8, and particularly, FIGS. 9 and 10.

Furthermore, the home gateway may also be connected to a visible/audible alarm (2) which informs the user of a security incident in a visible or audible manner based on information from the crime/disaster prevention sensors. Namely, a home gateway which is directly associated in position with the security incident or another home gateway which has an alliance relationship with the home gateway receives a sensing signal about the security incident from the crime/disaster prevention sensor and sets off the visible/audible alarm (2), thereby informing the user of the security incident although the user is distant from his or her wired/wireless terminal.

The home gateway may communicate with a name server (100), an alliance management server (200), a message transmission server (300) over the Internet (10) or the wired/wireless public network (20).

The name server (100), the alliance management server (200) and the message transmission server (300) are provided to perform the alliance security method according to an embodiment of the present invention. The servers except the alliance management server (200) may be omitted depending upon how the security system is realized or designed. It should be understood that since the three servers are just classified by function, two or more of the servers may be integrated into a single server. By way of example, each of the servers may exist in an independent hardware platform or the servers may be divided by function in a single hardware platform. Hereinafter, it is assumed that the three servers are separately realized. The function of each server is roughly as follows.

When an access to a home gateway with a dynamic IP address is needed over an external Internet, the name server (100) is responsible for informing an IP address of the home gateway. Namely, the name server (5) is a dynamic domain name server (DDNS) which is responsible for informing an Internet address of a home gateway in a household when an access to the home gateway is needed from outside the household.

The alliance management server (200) may store position information and/or IP information (e.g., IP address) of a home gateway, name of a home gateway, and information on alliance relationships between a plurality of home gateways. In addition, the alliance management server (200) may also store contact information (wired/wireless telephone numbers, e-mail addresses, account information, etc.) of a user (or owner) of a home gateway. In order to manage this information, the alliance management server (200) may include an information management DB (250), as shown in FIG. 2.

In addition, the alliance management server (200) is responsible for transmitting a security incident notification message to a home gateway which is registered as having an alliance relationship with a home gateway which detects a security incident. For this purpose, as shown in FIG. 2, the alliance management server (200) may include a communication unit (210), an alliance management unit (220), a gateway registration unit (230), and a list generation unit (240).

Examples of the incident notification message may include, but not limited to, a simple message (texts, photos, or videos) for notifying an allied home gateway and/or a user using the allied home gateway of a security incident, a report request message for requesting to report the security incident to relevant departments (e.g., building management companies, security companies, police departments, fire departments), and an alert request message for requesting an intense vigilance against the security incident.

When a user of a home gateway is not connected to the home gateway in a wired or wireless manner over an internal network or wishes to receive information in a more reliable manner although he or she is connected to the home gateway, the message transmission server (300) is responsible for transmitting information of interest (information on a security incident) to the user over the wired/wireless public network (20) upon request (or instruction) of the home gateway. The information of interest may be transmitted in form of texts, photos or videos. Namely, in an exceptional situation where the internal network is not correctly working, the message transmission server (7) may be responsible for transmitting information on a security incident to each home gateway in form of texts, photos or videos in compliance with rules set according to an alliance relationship between a home gateway and another home gateway.

In FIG. 1, the reference character AA denotes a report alliance relationship, and the reference character BB denotes an alert alliance relationship. As described below, the report alliance relationship and the alert alliance relationship may be determined based on a positional correlation. The reference character CC denotes a top priority correlation (or alliance relationship) which is determined irrespective of the positional correlation.

The report/alert alliance relationship and the roles/functions of the alliance management server (200) (and elements of the alliance management server (200)) and the message transmission server (300) will be appreciated more clearly from the following description of FIGS. 3 to 8.

A method for building a security system using home gateway alliance will be described with reference to FIGS. 3 and 4.

Figure 3:
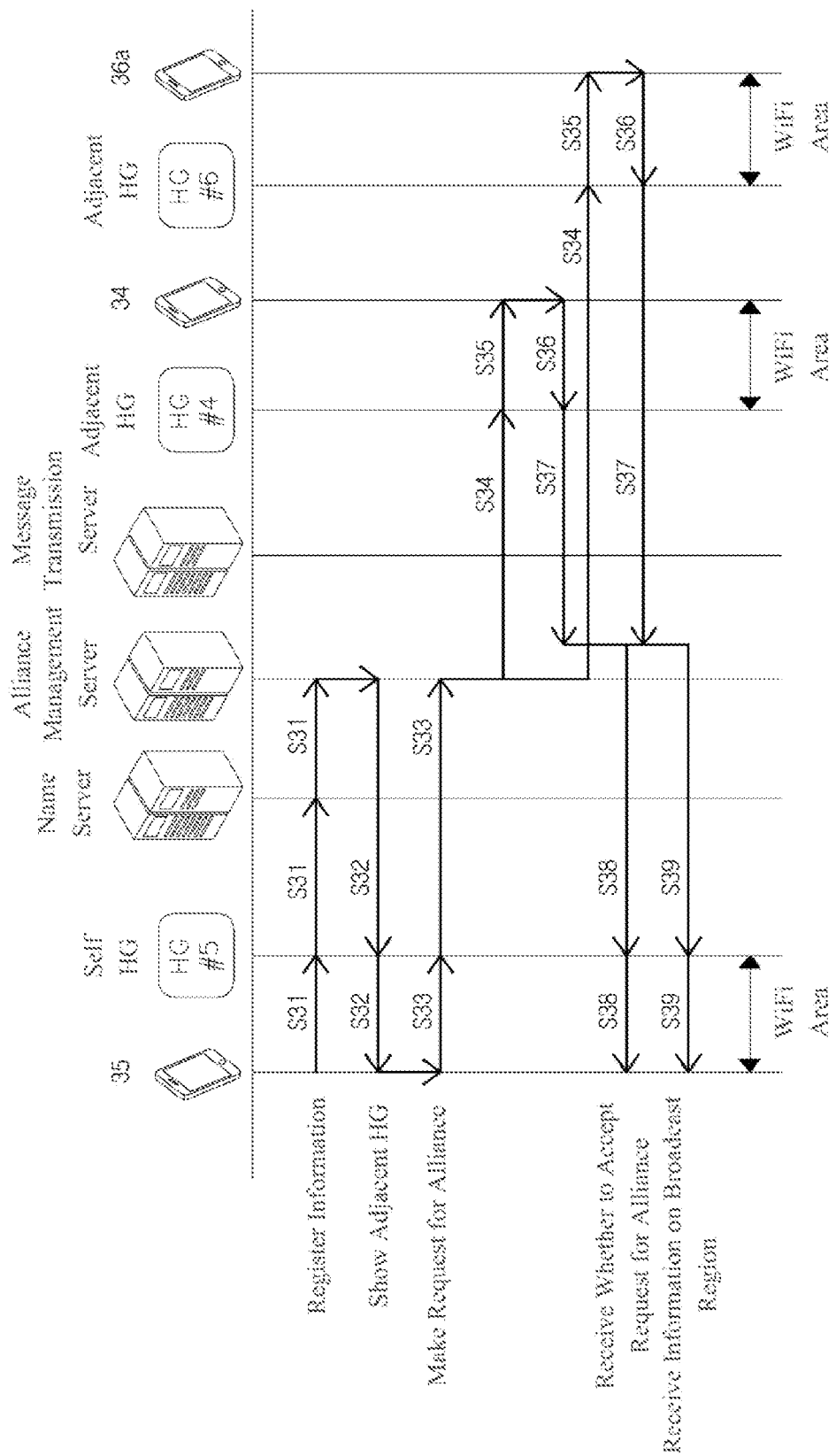
FIG. 3 is a flow diagram illustrating the process of registration and alliance of a home gateway when a user terminal is located inside an internal network according to an embodiment of the present invention.

FIG. 3 is a flow diagram illustrating the process of registration and alliance a home gateway when a user terminal is located inside an internal network. In FIG. 3, HG#5 denotes a home gateway which makes a request for registration, and HG#4 and HG#6 denote home gateways which receive an alliance request. It is assumed that a user terminal (35) of HG#5, a user terminal (34) of HG#4, and a user terminal (36a) of HG#6 communicate with their own home gateways over WiFi. Namely, it is assumed that each user terminal of each home gateway is located within an internal network of each home gateway. The internal network may refer to a personal area network (PAN) or a local area wireless communication network, such as WiFi or Bluetooth.

Referring to FIG. 3, a home gateway is registered [S31]. For this purpose, the name (alias or real name) of an owner of the home gateway, the address (position information) of the home gateway, and the telephone number to receive information at the outside in case of a security incident may be transmitted to the name server (100). The information is registered with the name server (100) by connecting to the home gateway (HG#5) through the user terminal (35). The information is simultaneously transmitted to the alliance management server (200). The transmitted registration information may be registered and managed by the gateway registration unit (230) of the alliance management server (200). Although this embodiment illustrates that the registration information is also transmitted to the name server (100), the registration information may only be transmitted to the alliance management server (200). In this case, the IP address information of the home gateway may be directly transmitted from the home gateway or the user terminal to the alliance management server (200).

The alliance management server (200) may extract home gateways adjacent to a newly registered home gateway from among the existing registered home gateways and generate information on a list of the extracted home gateways according to predetermined criteria related to a positional range based on newly registered address information. The list generation unit (240) of the alliance management server (200) may be responsible for the generation of list information. The list information on the adjacent home gateways may be transmitted by the alliance management unit (220) of the alliance management server (200) to the home gateway (HG#5) which makes a request for registration. The user terminal (35) may receive the list information through his or her own home gateway (HG#5) [S32].

Although the list information may be transmitted to the user terminal through the home gateway as described above, the list information may be directly transmitted from the alliance management server (200) to the user terminal which is related to the registration request. Likewise, although the present description mostly illustrates that the process of information transmission and receipt between the alliance management server (200) and the user terminal is performed through the home gateway, the process of information transmission and receipt may be directly performed between the alliance management server (200) and the user terminal. For clarity and convenience, the following description will be made based on the former case.

The list information may be displayed on a screen of the user terminal (35). The user may make a request for alliance through the screen by designating a home gateway with which to form an alliance from among the list of adjacent home gateways. The display of the list information and of the request for alliance may be processed by the user security execution application which is installed in the user terminal. The user security execution application will also process the following operations in the user terminal, which will not be mentioned in the following.

The request for alliance is transmitted through the home gateway (HG#5) to the alliance management server (200) [S33]. Once the request for alliance is received, the alliance management unit (220) of the alliance management server (200) transmits an alliance request message to the adjacent home gateways (HG#4, HG#6 in this embodiment), which are designated by the user, based on the request information [S34].

After receiving the alliance request message, the home gateways (HG#4, HG#6) may transmit the alliance request message to the user terminals (34, 36a) [S35]. If the home gateways (HG#4, HG#6) and the user terminals (34, 36a) are located in the internal network of the home gateways, the information is transmitted over WiFi network as shown in FIG. 3.

In response to the alliance request message, the user terminals (34, 36a) may transmit to their corresponding home gateways (HG#4, HG#6) whether to accept the request for alliance [S36]. The information on whether to accept the request for alliance is transmitted to the alliance management server (200) [S37]. The received information on whether to accept the request for alliance may be transmitted to the home gateway (HG#5) which has made the request for alliance, and also to the user terminal (35) [S38]. The alliance management unit (220) of the alliance management server (200) may also transmit the position information, IP information and name of the home gateway, which accepts the request for alliance (i.e., home gateway which is to be set as a report alliance relationship), to the home gateway (HG#5) and the user terminal (35).

In addition, the alliance management unit (220) of the alliance management server (200) may establish an alliance relationship based on the information on whether to accept the request for alliance.

In the present embodiment, the alliance relationship may be divided into the following three phases. It should be understood that the alliance relationship may be divided into more or less phases. Namely, the alliance relationship may vary according to how the alliance security system is designed and implemented. The three phases include a top priority alliance relationship, a report alliance relationship, and an alert alliance relationship. The top priority alliance relationship, denoted by the reference character CC in FIG. 1, is an alliance relationship, such as family or relatives, which can deal with a security incident most promptly irrespective of a positional relation with the home gateway. The information on the top priority alliance relationship may also be stored in the alliance management server (200) and also stored in the home gateway. The top priority alliance relationship is an alliance relationship which is set irrespective of the positional relation, which will be easily understood. Thus, a detailed description thereof will be omitted in the present description.

The report alliance relationship, denoted by the reference character AA in FIG. 1, is an alliance relationship which is established when the request for alliance is accepted in response to the alliance request message. Home gateways which have a report alliance relationship with each other are responsible for actively reporting a security incident to police departments or relevant departments or visiting the scene of the security incident to deal with the security incident when the security incident takes place in any one of the home gateways. In this case, since the description of the security incident can be made more clearly to the police departments or relevant departments, it may be more effective to deal with the security incident compared with a conventional unmanned security system.

The alert alliance relationship, denoted by the reference character BB in FIG. 1, may include home gateways within a predetermined position range from a home gateway where a security incident has occurred, irrespective of whether or not there is a request for alliance and an acceptance of the request for alliance (i.e., although there is no a request for alliance or no acceptance of the request for alliance). Accordingly, the home gateways located within the predetermined position range (i.e., home gateways which have an alert alliance relationship) may receive a broadcast notification message indicating that a security incident has occurred nearby. Hence, according to the embodiment of the present invention, the alliance security system enables users who do not have a report alliance relationship but an alert alliance relationship to recognize and deal with the security incident which has occurred nearby. The alliance management unit (220) of the alliance management server (200) may inform the home gateway (HG#5) and the user terminal (35), who has made the request for alliance, of the position information, IP information and names of the home gateways which have the alert alliance relationship [S39].

Figure 4:
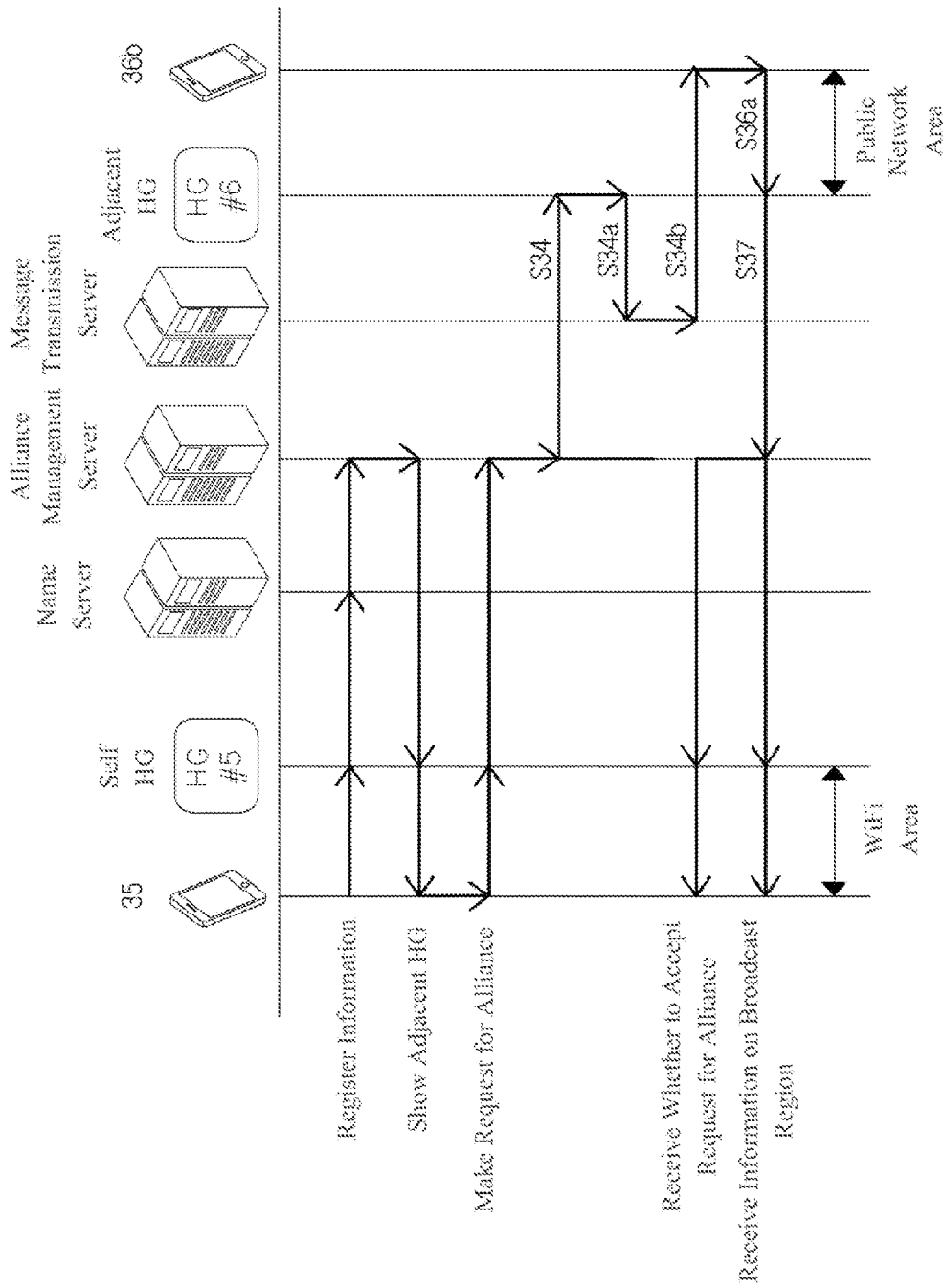
FIG. 4 is a flow diagram illustrating the process of registration and alliance of a home gateway when a user terminal is located outside an internal network according to an embodiment of the present invention.

Unlike FIG. 3, FIG. 4 is a flow diagram illustrating the process of registration and alliance of a home gateway when the user terminal is located outside the internal network. In FIG. 4, the user terminal (36b) of the home gateway (HG#6) is connected over the public network rather than over the internal network.

FIG. 4 is exactly the same as FIG. 3 in the process of transmitting the alliance request message from the alliance management server to the home gateway (HG#6). If the home gateway (HG#6) cannot find its corresponding user terminal (36b) within its own network, the home gateway (HG#6) makes a request for message transmission from the message transmission server (300) [S34a]. In response, the message transmission server (300) transmits the alliance request message to the user terminal (36a) over the public network [S34b]. After determining whether to accept the request for alliance, the user terminal (36b) transmits to the home gateway (HG#6) over the public network the information about whether to accept the request for alliance [S36a]. The subsequent processes are the same as those shown in FIG. 3.

The registration and alliance process for alliance security has been described above with reference to FIGS. 3 and 4. Hereinafter, the operation of the security system using the home gateway alliance will be described with reference to FIGS. 5 to 8.

Figure 5:
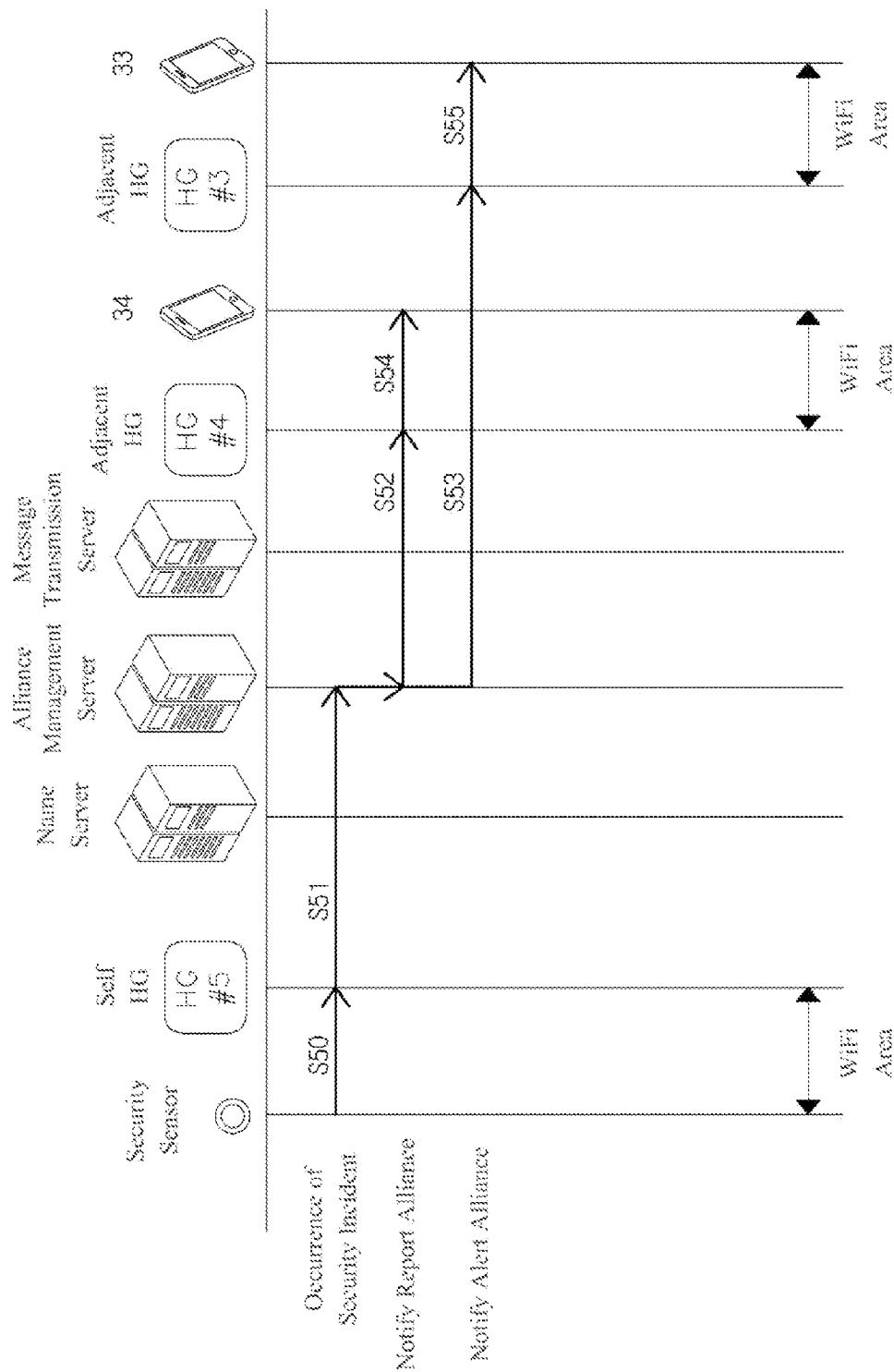
FIG. 5 is a flow diagram illustrating the operation of a security system over an internal network in case of a security incident according to an embodiment of the present invention.
Figure 6:
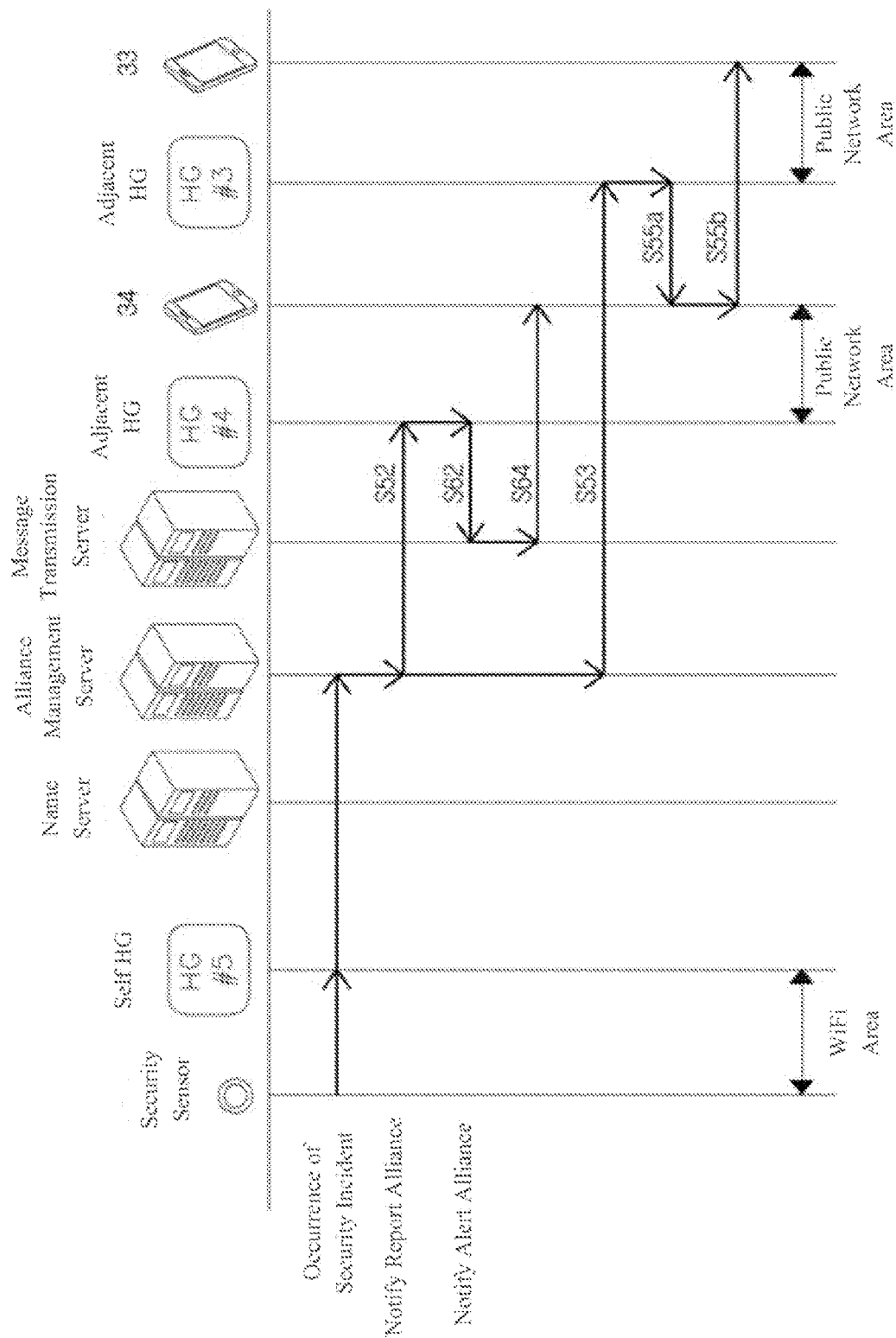
FIG. 6 is a flow diagram illustrating the operation of a security system over a public network in case of a security incident according to an embodiment of the present invention.
Figure 7:
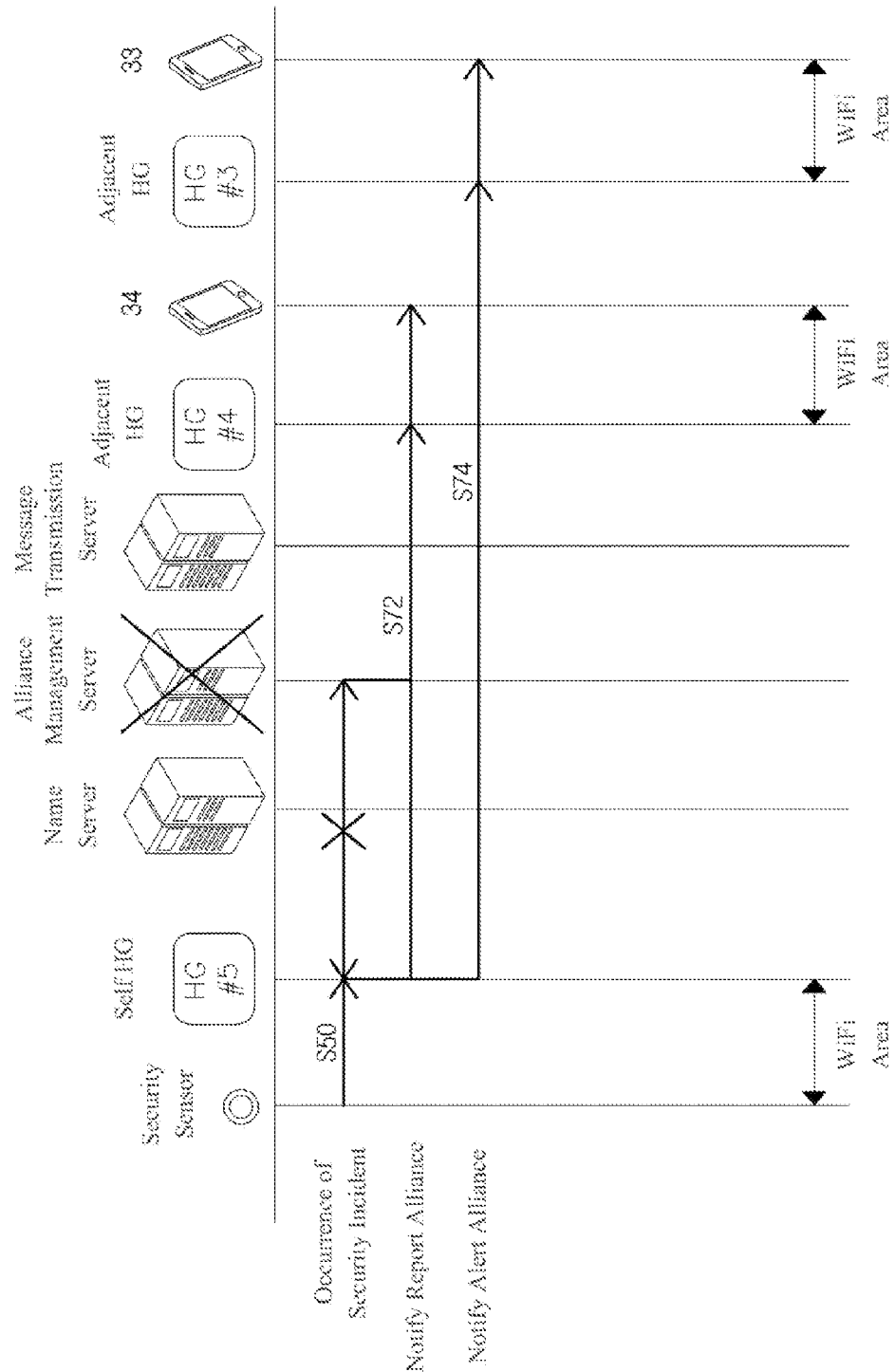
FIG. 7 is a flow diagram illustrating the operation of a security system in case of a communication failure with an alliance management server according to an embodiment of the present invention.
Figure 8:
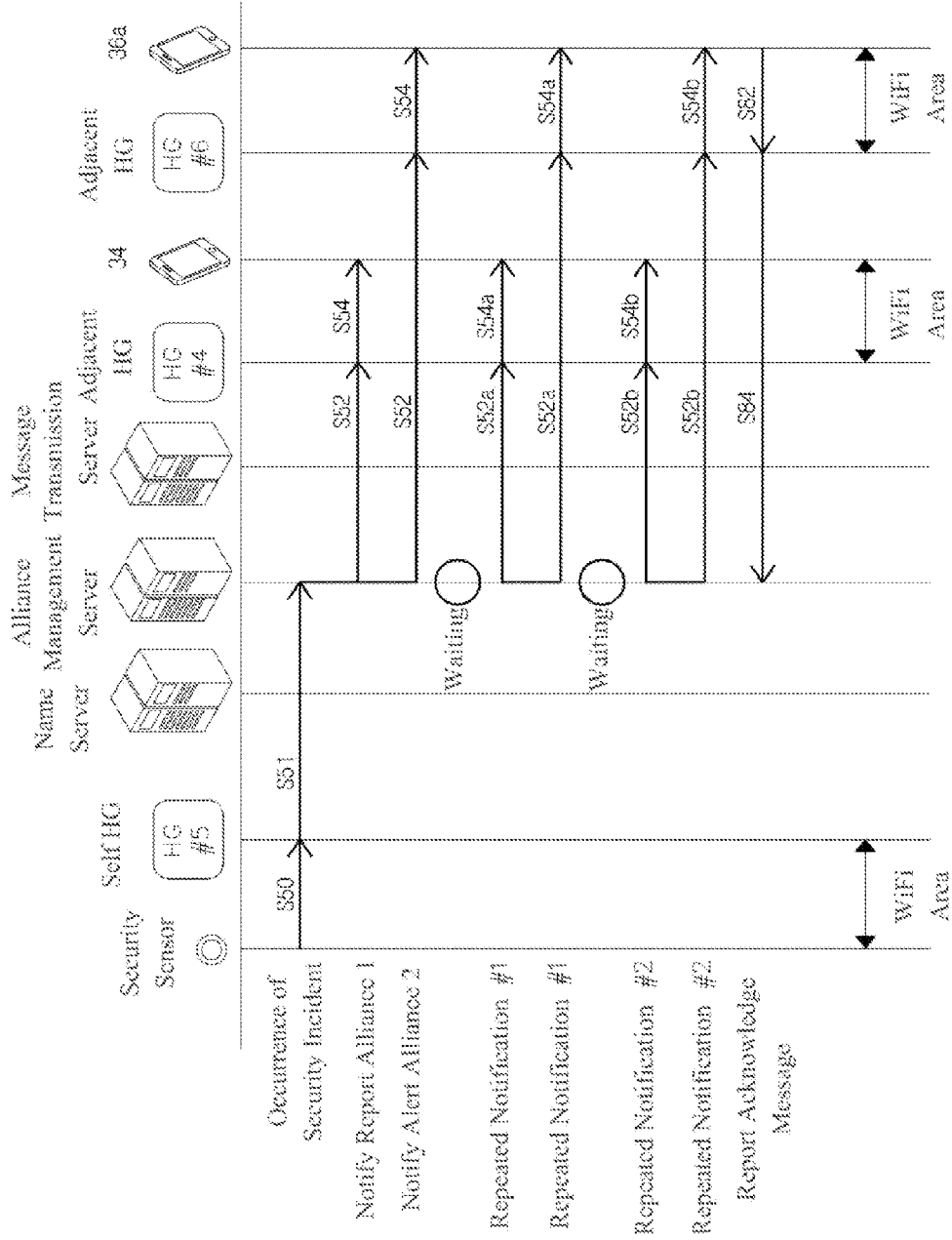
FIG. 8 is a flow diagram illustrating a repeated transmission process of a security incident notification message until completion of a security incident report according to an embodiment of the present invention.

FIG. 5 is a flow diagram illustrating the operation of the security system over the internal network in case of a security incident. FIG. 6 is a flow diagram illustrating the operation of the security system over the public network in case of a security incident. FIG. 7 is a flow diagram illustrating the operation of the security system in case of communication failure with the alliance management server. FIG. 8 is a flow diagram illustrating the repeated transmission process of a security incident notification message until completion of a security incident report. In FIGS. 5 to 8, it is assumed that the occurrence of a security incident is detected by security sensors.

Referring to FIG. 5, when a security incident occurs, a sensing signal for the security incident is transmitted to a corresponding home gateway (HG#5) [S50]. The home gateway (HG#5) then informs the alliance management server (200) of an event message about the occurrence of the security incident [S51]. The home gateway (HG#5) may inform a user terminal within the internal network of the information on the occurrence of the security incident.

In this case, the alliance management server (200) may transmit the security incident notification message to the home gateways (HG#4, HG#3) which have an alliance relationship with the home gateway (HG#5) where the security incident has occurred. FIG. 5 illustrates the home gateway (HG#4), which has a report alliance relationship with the home gateway (HG#5), and the home gateway (HG#3), which has an alert alliance relationship with the home gateway (HG#5). In addition, as described above, the security incident notification message may also be transmitted to a home gateway which has a top priority alliance relationship with the home gateway (HG#5). This message transmission may be sequentially performed in order of alliance priority (phase) or simultaneously performed. In this case, after receiving the security incident notification message, the home gateways (HG#4, HG#3) may transmit the security incident information to the user terminals (34, 33) [S54, S55]. The transmitted security incident information may have the same content and format as those of the security incident notification message received by the home gateway or may have different ones.

In FIG. 5, it is assumed that the home gateway having received the security incident notification message communicates with the corresponding user terminal over the internal network, such as WiFi network. However, both of them may communicate with each other over the public network as shown in FIG. 6.

In this case, the security incident notification message may be transmitted to the user terminal through the message transmission server (300) [S62, S64, S55a S55b of FIG. 6]. Namely, if the user terminal is not found in the internal network which is covered by the allied home gateway, the security incident information corresponding to the security incident notification message may be transmitted to the user terminal of the allied home gateway at the request of the allied home gateway. This process is substantially the same as that shown in FIG. 4, and thus a detailed description thereof will be omitted.

In FIG. 5, it is assumed that the home gateway (HG#5) where the security incident has occurred communicates properly with the alliance management server (200). FIG. 7 illustrates a communication failure therebetween. In this case, the home gateway (HG#5) may directly transmit the security incident notification message to the allied home gateways (HG#4, HG#3) based on at least one of the position information and the IP information of the allied home gateways (HG#4, HG#3) which are previously stored (i.e., transmitted through the process of registration and alliance in FIG. 3) [S72, S74]. This may also be applied to a case where the home gateway and the user terminal are not connected to each other over the internal network.

FIG. 5 illustrates that the alliance management unit (220) of the alliance management server (200) transmits only once the security incident notification message to the allied home gateway. FIG. 8 illustrates that the security incident notification message may be repeatedly transmitted at predetermined intervals. Specifically, FIG. 8 illustrates that the security incident notification message is first transmitted to the allied home gateways and user terminals [S52, S54] and subsequently transmitted at predetermined intervals [S52a S54a S52b S54b]. This notification may be repeatedly sent until a security incident report is completed by the user having received the security incident notification message and a report acknowledge message is received [S82, S84].

In this case, while the security incident report may be performed by the user who has received the security incident notification message, the security incident report may be automatically performed by the home gateway or the user terminal which has received the security incident notification message. By way of example, the home gateway may simultaneously receive the security incident notification message and transmit a control signal such that an inter-working security equipment performs a predetermined security function (e.g., setting off an audible alarm), or automatically report the security incident to a predetermined IP address or telephone number (e.g., security companies or police departments). Likewise, after receiving the security incident notification message, the user terminal may execute the following security execution application to control the above-mentioned security function and automatically report the security incident.

The function of the security system using home gateway alliance according to the embodiment of the present invention has been described above based on the relation of the alliance management server with the home gateways. Hereinafter, the function of the security execution application installed to perform the alliance security method in view of the user terminal will be described with reference to FIGS. 9 and 10.

Figure 9:
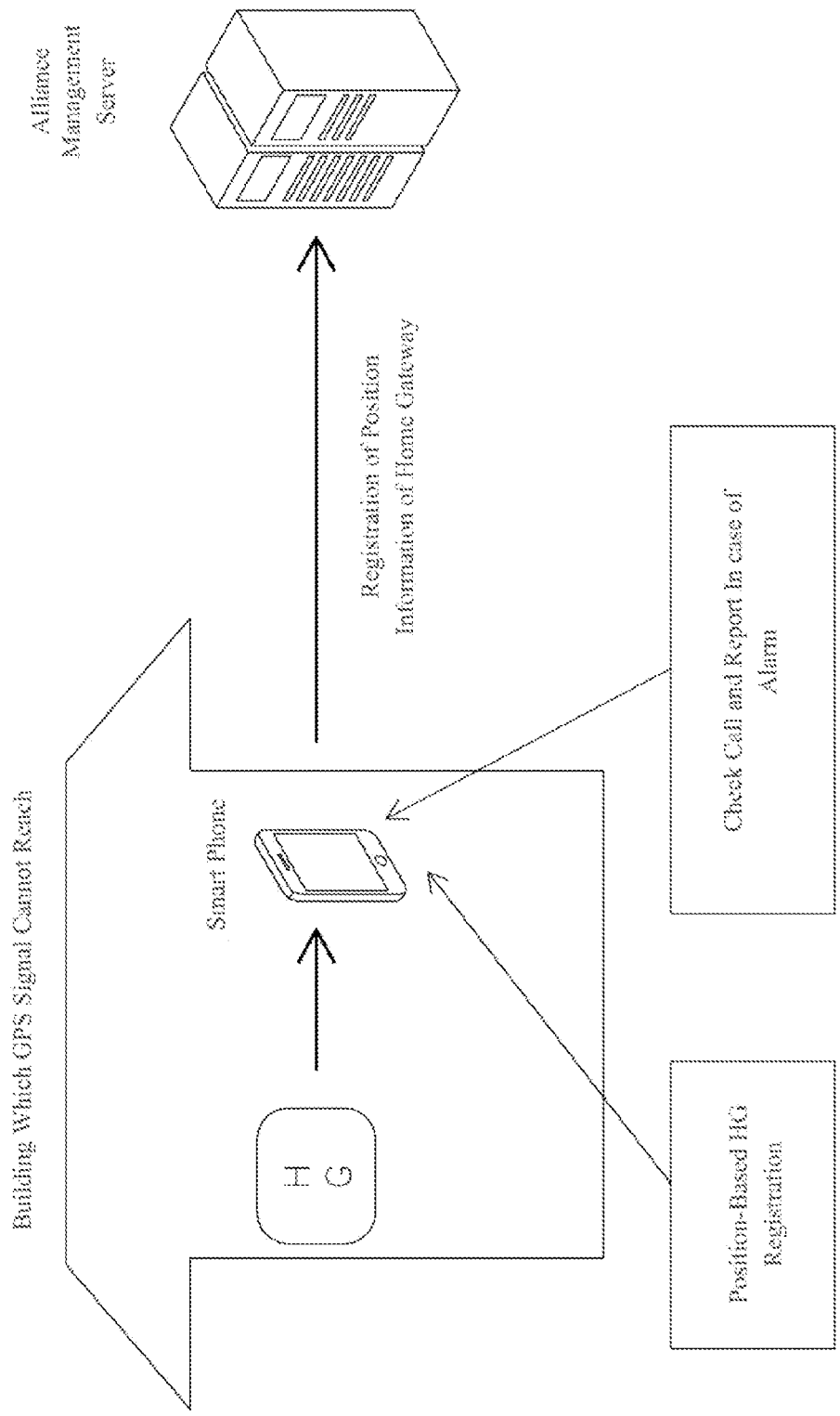
FIG. 9 is a diagram illustrating registration of position information when a home gateway cannot obtain the position information.
Figure 10:
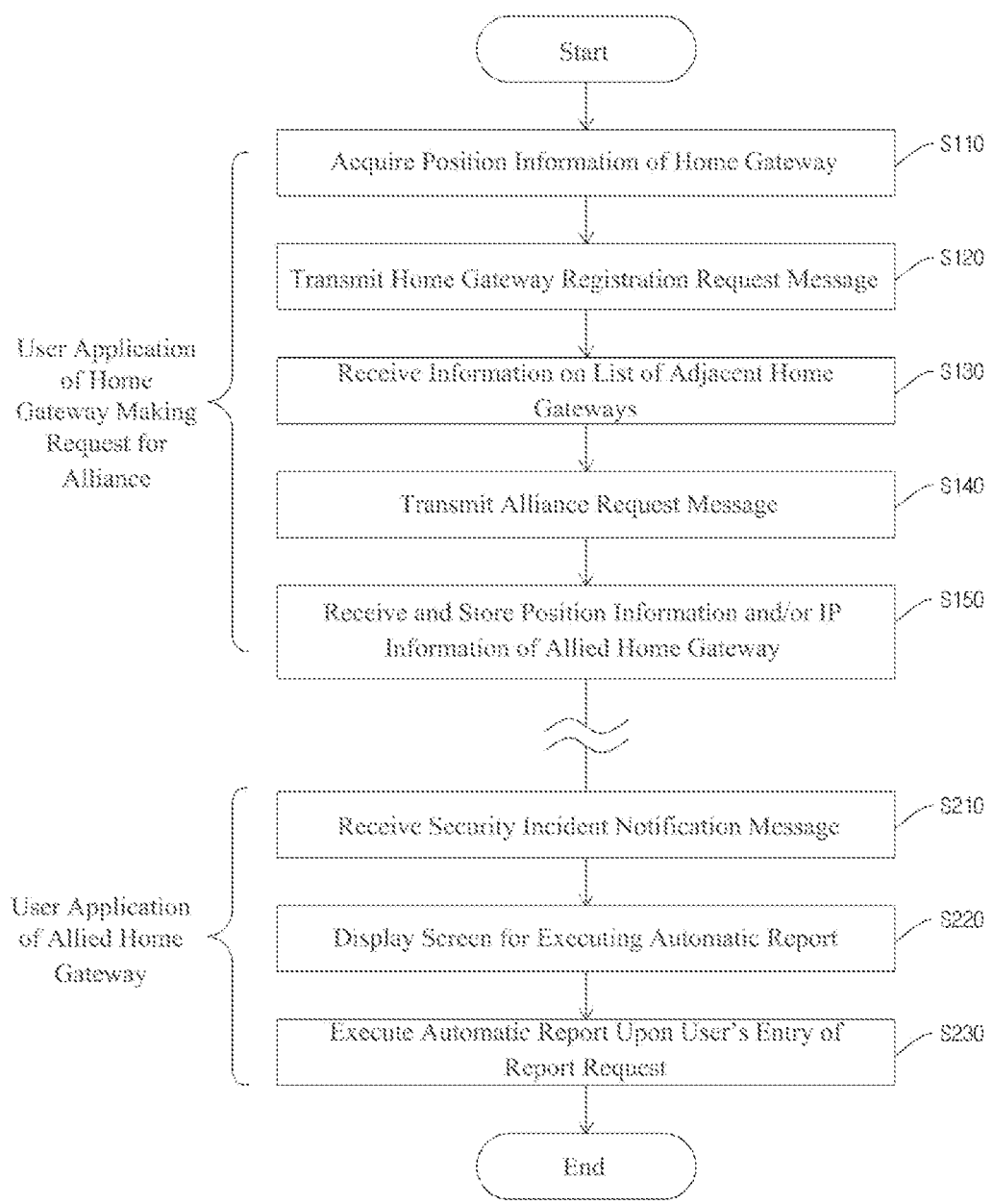
FIG. 10 is a flow chart illustrating execution of a security application installed in a user terminal to implement a security method according to an embodiment of the present invention.

FIG. 9 is a diagram illustrating the registration of position information when a home gateway cannot obtain its own position information. FIG. 10 is a flow chart illustrating execution of the security application installed in the user terminal to implement the security method according to an embodiment of the present invention.

In FIG. 9, it is assumed that a home gateway cannot acquire its own position information. The security execution application includes dealing with the situation in FIG. 9. FIG. 10 illustrates the operations (S110~S150) in a case where the user makes a request for alliance and the operations (S210~S230) in a case where the user is a recipient who receives a security incident notification message.

As shown in FIG. 9, when a GPS signal cannot reach a building, a home gateway in the building cannot acquire its own position information for itself. In this case, according to the embodiment of the present invention, the security execution application installed in the user terminal may acquire the position information of the home gateway, transmit the position information to the alliance management server (200), and register the position information with the alliance management server (200). The function of the security execution application, which includes the above process, will be described with reference to FIG. 10.

Referring to FIG. 10, in a case where the home gateway cannot acquire its own position information as shown in FIG. 9, the security execution application acquires the position information of the home gateway which is connected to the user terminal over the internal network [S110]. The position information may be acquired as follows. For example, the security execution application may acquire the position information of the home gateway through an external position registration server (e.g., HLR) based on identification information, such as IP address, of the home gateway. For another example, the security execution application may acquire the position information of the home gateway by referring to the position information of the user terminal and retrieving the position information of a home gateway which is closest to the user terminal. The acquisition method is not limited thereto. Once the position information of the home gateway is acquired, the security execution application transmits a registration request message including the position information to the alliance management server (200) [S120].

Next, the security execution application receives information on a list of adjacent home gateways from the alliance management server (200) or its own home gateway [S130]. Once a home gateway is designated by the user from among the list information, the security execution application transmits the alliance request message including the information to its own home gateway or the alliance management server (200) [S140]. The security execution application receives and stores the position information and/or IP information of a home gateway, which is set as an alliance relationship, from the alliance management server (200) or its own home gateway. The operations S130~S150 have been already described with reference to FIGS. 3 and 4, and thus a detailed description thereof will be omitted.

When the registration and the setting of alliance relationship are completed and the security incident notification message is received from the allied home gateway [S210], the security execution application may display a screen for executing an automatic report on the security incident [S220]. By way of example, when the security incident notification message is received, the security execution application may automatically display a screen for showing the user what actions or roles to do or how to report the security incident in case of the security incident.

In response, when the user inputs a request for report through the screen (e.g., button input by way of one click or one touch), the security execution application may automatically report the security incident to a predetermined IP address or telephone number (e.g., security companies or police departments) [S230]. This embodiment illustrates that the security incident is reported by the user input. However, it has been already described that the security incident may be automatically reported without the additional user input at the same time when the security incident notification message is received. Once the report is completed, the security execution application may inform the alliance management server (200) of the completion of report.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A security system using home gateway alliance, comprising an alliance management server, wherein the alliance management server comprises:
   a gateway registration unit which registers at least one of position information and IP (Internet Protocol) information of a home gateway upon making a request for registration of the home gateway; and
   an alliance management unit which, in response to a request for alliance from a user terminal of the home gateway registered with the gateway registration unit, sets an alliance relationship between the home gateway having made the request for alliance and other home gateways adjacent to the home gateway having made the request for alliance and, when a security incident message indicative of an occurrence of a security incident is received from the home gateway registered with the gateway registration unit, transmits a security incident notification message to either the allied home gateways, which have an alliance relationship with the home gateway where the security incident has occurred, or user terminals of the allied home gateways,
   wherein the security incident notification message is provided for users of the allied home gateways to cope with the security incident upon receipt of the security incident notification message,
   wherein the alliance management unit manages the alliance relationship, which is classified into a report alliance relationship and an alert alliance relationship, and wherein the alliance management unit sets, as the report alliance relationship, home gateways which accept the request for alliance and sets, as the alert alliance relationship, other home gateways than the home gateways set as the report alliance relationship, from among all of home gateways located within a broadcast region which is predetermined based on a positional relation with the home gateway having made the request for alliance.

2. The security system of claim 1,
wherein the alliance management server further comprises a list generation unit which, upon receipt of the request for registration of the home gateway, generates information on a list of at least one home gateway adjacent in position to the home gateway which is requested to be registered, based on predetermined criteria, and
wherein the alliance management unit transmits the list information to the home gateway which is requested to be registered, or the user terminal of the home gateway which is requested to be registered.

3. The security system of claim 2,
wherein when receiving a request for alliance with a home gateway designated by a user from among the list information, the alliance management unit transmits an alliance request message to the designated home gateway or a user terminal of the designated home gateway, and
wherein the alliance management unit transmits information on whether to accept the request for alliance, which is received from the user terminal of the designated home gateway in response to the alliance request message, to the user terminal or the home gateway which has made the request for alliance.

4. The security system of claim 1, wherein the alliance management unit transmits to the home gateway or the user terminal which has made the request for alliance at least one of position information and IP address of a home gateway which has the report alliance relationship with the home gateway having made the request for alliance and at least one of position information and IP address of a home gateway which has the alert alliance relationship with the home gateway having made the request for alliance.

5. The security system of claim 4, wherein in case of a communication failure between the home gateway where the security incident has occurred and the alliance management server, the home gateway where the security incident has occurred transmits a security incident notification message to the home gateway which has the report alliance relationship and the home gateway which has the alert alliance relationship, based on at least one of the position information and the IP address of the home gateway which has the report alliance relationship and at least one of the position information and the IP address of the home gateway which has the alert alliance relationship.

6. The security system of claim 1,
wherein the security incident notification message is transmitted to the allied home gateway, and
wherein when the user terminal of the allied home gateway is not found within an internal network area which is covered by the allied home gateway, the security system further comprises a message transmission server which transmits security incident information corresponding to the security incident notification message to the user terminal of the allied home gateway, upon request of the allied home gateway.

7. The security system of claim 1, wherein the alliance management unit repeatedly transmits the security incident notification message to a home gateway having the report alliance relationship at predetermined intervals until the alliance management unit receives a report completion acknowledge message after transmitting the security incident notification message to the home gateway having the report alliance relationship.

8. The security system of claim 1, wherein the allied home gateway having received the security incident notification message transmits a control signal such that an interworking security equipment performs a predetermined security function, or automatically reports the security incident to a predetermined IP address or telephone number.

9. A security method using home gateway alliance which is executed by an alliance management server included in a security system, the security method comprising:
registering at least one of position information and IP (Internet Protocol) information of a home gateway with a gateway registration unit of the alliance server upon receipt of a request for registration of the home gateway;
in response to a request for alliance from a user terminal of the home gateway registered with the gateway registration unit, setting an alliance relationship between the home gateway having made the request for alliance and other home gateways adjacent to the home gateway having made the request for alliance; and
when a security incident message indicative of an occurrence of a security incident is received from the home gateway registered with the gateway registration unit, transmitting a security incident notification message to either the allied home gateways, which have an alliance relationship with the home gateway where the security incident has occurred, or user terminals of the allied home gateways,
wherein the security incident notification message is provided for users of the allied home gateways to cope with the security incident upon receipt of the security incident notification message, and
wherein the setting of the alliance relationship includes managing the alliance relationship, which is classified into a report alliance relationship and an alert alliance relationship, setting, as the report alliance relationship, home gateways which accept the request for alliance and setting, as the alert alliance relationship, other home gateways than the home gateways set as the report alliance relationship, from among all of home gateways located within a broadcast region which is predetermined based on a positional relation with the home gateway having made the request for alliance.

10. The security method of claim 9, further comprising:
generating information on a list of at least one home gateway adjacent in position to the home gateway which is requested to be registered, based on predetermined criteria;
transmitting the list information to the home gateway which is requested to be registered, or the user terminal of the home gateway which is requested to be registered;
when receiving a request for alliance with a home gateway designated by a user from among the list information, transmitting an alliance request message to the designated home gateway or a user terminal of the designated home gateway; and
transmitting information on whether to accept the request for alliance, which is received from the user terminal of the designated home gateway in response to the alliance request message, to the user terminal or the home gateway which has made the request for alliance.

11. The security method of claim 9, further comprising transmitting to the home gateway or the user terminal which has made the request for alliance at least one of position information and IP address of a home gateway which has the report alliance relationship with the home gateway having made the request for alliance and at least one of position information and IP address of a home gateway which has the alert alliance relationship with the home gateway having made the request for alliance.

12. The security method of claim 9, further comprising repeatedly transmitting the security incident notification message to an adjacent home gateway having the report alliance relationship at predetermined intervals until the alliance management unit receives a report completion acknowledge message after transmitting the security incident notification message to the home gateway having the report alliance relationship.

13. A non-transitory computer readable storage for storing one or more programs with instructions for a user terminal communicating with a home gateway and an alliance management server to execute a security method using home gateway alliance, wherein the security method using home gateway alliance comprises:
 acquiring position information of a home gateway which is connected with the user terminal over an internal network;
 transmitting to the alliance management server a message of a request for registration of the home gateway, the message including the position information;
 receiving information on a list of at least one home gateway adjacent in position to the home gateway which is requested to be registered;
 transmitting to the home gateway or the alliance management server a message of a request for alliance with a home gateway designated by a user from among the list information; and
 receiving and storing at least one of position information and IP address information of the home gateway which is set as an alliance relationship according to the message of a request for alliance, and
 wherein, when the alliance relationship is set, the method further comprising managing the alliance relationship, which is classified into a report alliance relationship and an alert alliance relationship, setting, as the report alliance relationship, home gateways which accept the request for alliance and setting, as the alert alliance relationship, other home gateways than the home gateways set as the report alliance relationship, from among all of home gateways located within a broadcast region which is predetermined based on a positional relation with the home gateway having made the request for alliance.

14. The non-transitory computer readable storage of claim 13, wherein the security method using home gateway alliance further comprises:
 when a security incident notification message is received from the home gateway which is set as an alliance relationship, displaying a screen for executing an automatic report on the security incident; and
 when a user inputs a request for report through the screen, executing the automatic report on the security incident to a predetermined IP address or telephone number.

* * * * *